Figure 1:
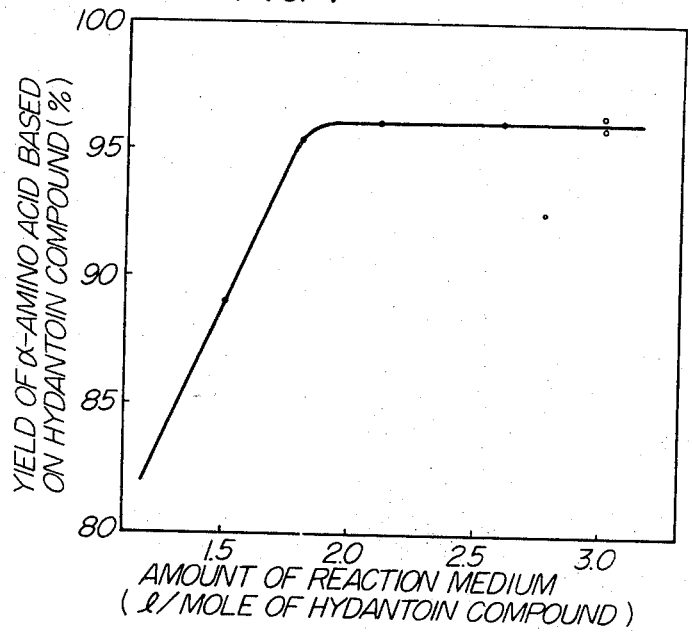

United States Patent

Shima et al.

[15] 3,668,221
[45] June 6, 1972

[54] PROCESS FOR PRODUCING α-AMINO ACIDS

[72] Inventors: Takesaburo Shima; Akio Yamagishi; Masao Sada; Zenichi Yamamoto; Hasunaga Shiozaki, all of Niihama-shi, Japan

[73] Assignee: Sumitomo Chemical Company, Ltd., Osaka, Japan

[22] Filed: July 21, 1967

[21] Appl. No.: 655,137

[30] Foreign Application Priority Data

July 28, 1966 Japan..................................41/49736

[52] U.S. Cl.................260/326.14T, 260/518 R, 260/534 R, 260/534 C, 260/534 E, 260/534 M, 260/534 S
[51] Int. Cl. ....................................C07d 27/60, C07c 99/08
[58] Field of Search..............260/534, 518, 326.14 T, 534 C, 260/534 E, 534 M, 534 R, 534 S

[56] References Cited

UNITED STATES PATENTS

| | | | |
|---|---|---|---|
| 2,480,644 | 8/1949 | Goldsmith et al. | 260/534 |
| 2,527,366 | 10/1950 | Livak et al. | 260/319 |
| 2,557,920 | 6/1951 | White | 260/326.14 |

FOREIGN PATENTS OR APPLICATIONS

| | | | |
|---|---|---|---|
| 4,010,211 | 5/1965 | Japan | 260/534 R |

*Primary Examiner*—Lorraine A. Weinberger
*Assistant Examiner*—John F. Terapane
*Attorney*—Stevens, Davis, Miller & Mosher

[57] ABSTRACT

A process for producing α-amino acid by hydrolyzing a hydantoin compound in which the hydrolysis is effected while withdrawing out of the system ammonia and carbon dioxide generated during the hydrolysis and while during the reaction period, adjusting the amount of reaction medium to at least 1.5 *l.* per mole of the hydantoin compound initially employed. Particularly, a process in which the hydrolysis is effected in such a manner that an aqueous alkaline solution of hydantoin compound is fed to the upper part of a plate column-type reactor or packed column-type reactor and, simultaneously, steam is fed from the lower part of said reactor, while withdrawing ammonia and carbon dioxide out of the system. By thus effecting the hydrolysis without concentrating the reaction liquid, and while withdrawing the generated gases out of the system, α-amino acid can be produced in high yields.

11 Claims, 2 Drawing Figures

PATENTED JUN 6 1972　　　　　　　　　　　　　　　　3,668,221

INVENTOR

BY

ATTORNEY

A PROCESS FOR PRODUCING α-AMINO ACIDS

This invention relates to an improvement in a process for producing α-amino acid by the hydrolysis of a hydantoin compound and to an apparatus. More particularly, the invention pertains to an improved method for preparing α-amino acid in high yields by hydrolyzing a hydantoin compound in the presence of an alkali while withdrawing under pressure a part of generated gases, wherein the gases are effectively withdrawn without excessively concentrating the reaction liquid, and an apparatus for practicing such process.

A hydantoin compound is hydrolyzed in the presence of an alkali to amino acid according to the following equation,

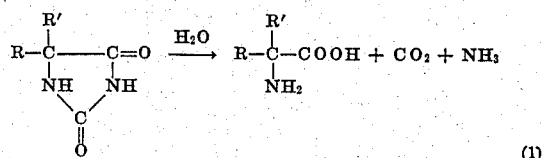

(1)

wherein R and R' are individually a hydrogen atom, alkyl group or hetero-atom-containing alkyl group.

As such hydrolysis process, there has heretofore been proposed in the U.S. Pat. No. 2,557,920 a process in which a hydantoin compound is treated under pressure at an elevated temperature in the presence of an alkali. According to the above process, the hydrolysis of a hydantoin compound was effected by using 2 – 4 moles per mole of the hydantoin compound of caustic alkali or alkali carbonate and dissolving said compounds in 3 – 3.5 $l.$ of water. However, the yields attained by the above hydrolysis process were low. For example, in the case of batch-wise reactions, the yields of triptophane, leucine and methicnine based on corresponding hydantoin compounds were 90.0 percent, 84 percent and 74.3 percent respectively, and in the case where the hydrolysis was effected continuously in a cylindrical reactor, the yield of methionine was not more than 80.6 percent.

As another hydrolysis process, there was proposed in Japanese Patent Publication No. 10,211/65 a method carried out by effecting the hydrolysis while withdrawing out of the system the generated ammonia and carbon dioxide gases shown in the above-mentioned equation (1). This method has such advantage that the amount of alkali employed can be made smaller but suffers from such drawback that the yields were still low. In the examples of said patent publication, hydrolysis of hydantoin compounds were effected by using 0.05 mole per mole of hydantoin compound of sodium hydroxide or sodium carbonate, while removing substantially completely the generated carbon dioxide and ammonia. However, the yields of norvaline and alanine based on the hydantoin compound used under the said hydrolysis were not more than 72.2 percent and 70.9 percent respectively.

In the above circumstances, there has been desired an improvement of the hydrolysis reaction yields. In this case, it was considered, in view of the chemical equilibrium of the above-mentioned equation (1), that the reaction yields increased with increasing amounts of ammonia and carbon dioxide withdrawn during the hydrolysis. Therefore, the present inventors initially attempted to improve the reaction yields along the above line to obtain such results that the yields were lowered contrary to expectation. Thereafter, the inventors further examined the above phenomenon to find that such lowering in yield is due to the fact that in withdrawing ammonia and carbon dioxide, the reaction medium is vaporized together with said gases, whereby the reaction liquid is concentrated with the result that the reactants or reaction products probably react each other to form undesirable side reaction products.

The present invention has been established on the basis of such finding that the amount of reaction medium at the time of hydrolysis has a great influence on the reaction yield.

An object of the present invention is to provide a process for producing α-amino acid in high yield by effecting the hydrolysis of hydantoin compounds efficiently.

Other objects will be apparent from the following descriptions. To accomplish these objects, the present invention provides a process for producing α-amino acid by hydrolyzing a hydantoin compound in the presence 'f an alkali, characterized in that the hydrolysis is effected while withdrawing the gases generated during the reaction and the hydrolysis is substantially carried out in an aqueous medium in an amount of at least 1.5 $l.$ per mole of the hydantoin compound initially employed.

The present invention further provides an apparatus for the hydrolysis of hydantoin compounds to yield α-amino acid, which apparatus comprises a plate column-type reactor or packed column-type reactor provided at the upper part an inlet for hydantoin compound solution and an outlet for withdrawing generated gases, and at the lower part with an outlet for reaction product liquid and an inlet for reaction medium vapor or a means for indirectly heating the reaction product liquid to generate a reaction medium vapor.

Typical examples of the hydantoin compounds, which are starting materials employed in the process of the present invention, include hydantoin, 5-methylhydantoin, 5,5-dimethylhydantoin, 5-isopropylhydantoin, 5-(2'-methylpropyl)-hydantoin, 5-(1'-oxyethyl)-hydantoin, 5-(2'-methylthioethyl)-hydantoin, 5-carboxymethylhydantoin, 5-(2'-carboxyethyl)-hydantoin, 5-benzylhydantoin and 5-(3'-indolylmethyl)hydantoin.

The hydrolysis of these hydantoin compounds is effected in the presence of an alkali ordinarily at 130° – 220° C. and 1.8 – 27 kg/cm² for 10 – 120 minutes, while withdrawing ammonia and carbon dioxide, and further, a reaction medium vapor accompanied with said gases. As the reaction medium in the above case, water is used ordinarily, but an aqueous alcohol solution or the like medium may also be used. As said alkali, caustic alkali or a carbonate of an alkali metal may be used. Such alkali is desirably used in an amount more than one equivalent, preferably about 1 – 4 equivalents, per mole of hydantoin compound.

In accordance with the present process, the amount of alkali employed is decreased by withdrawing out of the reaction system such gas components as ammonia and carbon dioxide generated during the hydrolysis. What is of importance in this case is that during the hydrolysis, the amount of reaction medium be adjusted to at least 1.5 $l.$, preferably at least 1.8 $l.$, per mole of the hydantoin compound initially employed. However, if the amount of reaction medium is excessive, the reaction rate becomes slow or operational disadvantages are brought about. Therefore, the amount of reaction medium is desirably at most about 5 $l.$ per mole of the hydantoin compound initially employed.

Figure 2:
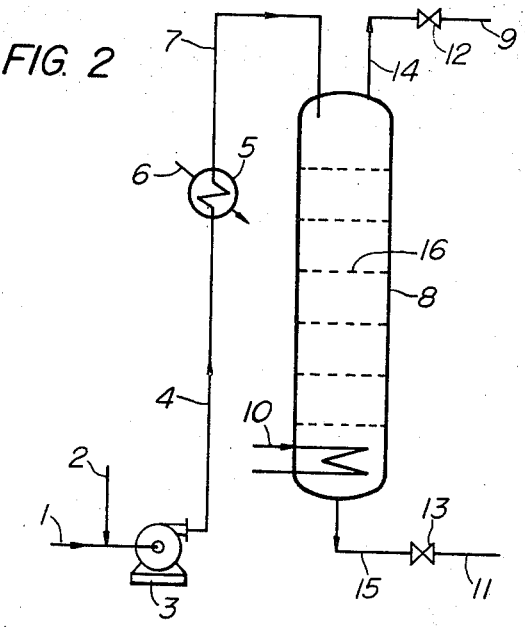

In the accompanying drawings, FIG. 1 shows the relationship between the amount of medium and the yield of α-amino acid obtained by the hydrolysis, and FIG. 2 shows a flow-sheet of the present process when carried out in a continuous manner.

In FIG. 1, the relationship between the amount of medium and the yield of α-amino acid was obtained in the case where 5-(2'-methylthioethyl)hydantoin was hydrolized at about 160° C. and 5 – 7 kg/cm², using, per mole of said hydantoin compound, 2 moles of caustic soda and 1.3 – 3.0 $l.$ of water, while withdrawing ammonia, carbon dioxide and steam accompanied with said gases. In this case, the amount of medium was adjusted to a definite amount by injecting steam into the hydrolysis reaction system during the hydrolysis. As is clear from the drawing, it is possible to hydrolyze, in accordance with the present invention, a hydantoin compound to α-amino acid in such a high yield as 90 – 97 percent.

In order to maintain, during the hydrolysis, the amount of reaction medium within the above-mentioned range, various processes may be used. For example, a first process is that from the initiation of the hydrolysis, the reaction medium is used in more than a suitable amount so that the amount of the medium does not become insufficient even when a part of the medium has been vaporized during the hydrolysis. A second process is that gas components withdrawn from the hydrolysis reaction system is rectified to liquefy and separate the reaction medium accompanied therewith and the thus liquefied and separated medium is refluxed to the hydrolysis reaction system. A third process is that a fresh reaction medium is fed to the hydrolysis reaction system to supplement the amount of reaction medium discharged out of the system. Particularly preferable as such process is that water is used as the reaction medium and the hydrolysis is effected while supplementing the reaction medium by injection of steam. This process is markedly preferable because not only the operation is simple but also there are brought about such advantages that by said injected steam, the reaction system can be heated, the heat of vaporization of ammonium and carbon dioxide can be supplied and the rate of removal of ammonia and carbon dioxide out of the system can be increased. Alternatively, an inert gas such as nitrogen or hydrogen may be injected together with steam into the reaction system to further increase the rate of removal of ammonia and carbon dioxide out of the system. In this case, however, it is essential to take such a care that the amount of water in the reaction system be not reduced by concentration to less than 1.5 $l.$ per mole of hydantoin compound initially employed. A third process is most efficient when the hydrolysis is effected in a slender reactor, the liquid which has substantially completed the hydrolysis is indirectly heated by means of a heating medium such as steam, and a reaction medium vapor is generated from said liquid and is fed to the upper zone of the reactor in which the hydrolysis is substantially effected. In this process, the reaction liquid heated at the bottom of the reactor is necessarily concentrated but when back mixing in the hydrolysis reactor is small and the retention time of the bottom part of the reactor is short, the occurrence of side reactions can be prevented. Of course the reaction liquid at the bottom of the reactor may be heated directly by injecting steam.

The process of the present invention is particularly effective when carried out in a continuous manner. A preferred mode of practice of the present invention effected in a continuous manner will be explained below with reference to FIG. 2. In FIG. 2, a hydantoin compound is fed through line 1. Of course, a synthesis liquid of hydantoin compound from a hydrantoin compound sythesis step may be fed as such without any particular purification. Through line 2, an alkali is fed in the form of a solution. The liquid fed through the lines 1 and 2 are mixed in a suitable ratio in pump 3 and lines 4 and 7, and the mixed liquid is passed under pressure to hydrolysis reactor 8. Before passing to the reactor, the mixture may be preheated in heat exchanger 5. The preheating is not always necessary. The heating medium for the preheating may be any of steam, a reactor exit liquid and other heating medium. The heating medium is introduced through line 6. The reactor 8 is a column packed with such as Raschig ring or a plate column such as a bubble cap column or perforated plate column (FIG. 2 shows as an example thereof, a perforated plate column having perforated plates 16). In the present invention, the reactor employed is of such a type and therefore in a zone in which substantial hydrolysis takes place (other zone in the reactor 8 than the bottom at which the reaction liquid is heated), steam ascends from the lower part of the reactor and is condensed, with the result that the reaction liquid is not concentrated and ammonia and carbon dioxide can be effectively withdrawn. Moreover, not only the back mixing of the reaction liquid can be prevented but also the reaction rate increases to make it possible to shorten the retention time of the reaction liquid. It is desirable that the reactor 8 be so designed as to make the continuous liquid portion large and to make the gas-liquid contact favorable. At the column bottom, the reaction liquid (aqueous solution) is indirectly heated, by introduction of steam or a heating medium through line 10, to generate steam from the reaction liquid. In place of heating the reaction liquid at the bottom of the reactor in the above manner, there may be employed such a procedure that the reaction liquid is heated in a heating means outside the reactor and the steam generated in this case is injected into the bottom of the reactor. When any of the above procedures is adopted, the generated steam contains small amounts of ammonia and carbon dioxide, but even such steam may sufficiently be used.

Further, in place of the line 10, a steam injecting line may be provided to inject steam directly into the lower part of the reactor 8. As the steam ascends inside the reactor, it is replaced with ammonia and carbon dioxide dissolved in the reaction liquid, and the reaction liquid is not concentrated, while gases to be withdrawn are concentrated and are discharged through line 14, pressure-reducing valve 12 and line 9.

Even when no such withdrawal of gases is effected, the hydrolysis can be done on commercial scale, but the withdrawal of gases makes it possible to minimize the amount of alkali employed as well as to increase the yield of α-amino acid. When indirectly heated by means of the line 10, the reaction liquid is concentrated at the final plate at the column bottom. However, the reaction liquid at said plate has substantially completed the reaction and hence may be immediately withdrawn, whereby the retention time of the reaction liquid in said portion can be shortened and the undesirable lowering of yield can be avoided. The liquid which has completed the reaction (reaction product liquid) is withdrawn through line 15, pressure-reducing valve 13 and line 11. This liquid contains an alkali salt of α-amino acid and therefore the salt is neutralized with an acid to obtain α-amino acid.

In accordance with the present invention, hydantion compounds can be hydrolyzed in the above manner to give α-amino acid in high yields.

The following examples illustrate the invention but the invention is, of course, not limited to the examples.

1

β-Methylthiopropionaldehyde was reacted with hydrocyanic acid and excess ammonium bicarbonate according to ordinary process to obtain 5-(2'-methylthioethyl)hydantoin. To an aqueous solution containing 0.2 mole of said hydantoin, 0.4 mole of caustic soda was added, and the amount of water was made 400 g. The aqueous solution was charged in a 500 ml. autoclave provided with a stirrer and was heated and reacted at 160° C. for 60 minutes, while injecting saturated steam under a pressure of 7 kg/cm² through the bottom of the autoclave. During the reaction, a part of the generated gases and steam was continuously withdrawn so that the pressure became 5.8 kg/cm². After completion of the reaction, the injection of steam and the withdrawal of gases were ceased, and the reaction liquid was cooled and was then subjected to measurement to observe no substantial change in amount of water in the reactor. According to the above process, the yield of the resulting methionine was 96.1 percent based on said hydantoin.

A reaction was effected in exactly the same manner as above, except that in place of injecting steam through the bottom of the autoclave, the reaction liquid was externally heated by means of an electric heater, with stirring. During the reaction, about 90 g. of steam was withdrawn together with the generated gases, whereby the yield of methionine was lowered to 90.1 percent.

EXAMPLE 2

In the apparatus shown in FIG. 2, the reactor 8 was replaced by a reactor having 10 bubble cap plates. To this reactor were continuously fed 5 $l$./hr. of an aqueous solution containing 4 moles of 5-(2'-methylthioethyl)hydantoin prepared in the same manner as in Example 1 and 3.2$l$./hr. of an aqueous solution containing 240 g. of caustic soda. To the bottom of the reactor, steam was indirectly sent and the reaction liquid at the bottom was heated to 180° C. to generate steam. The column top was maintained at about 160° C. under a pressure of 5 kg/cm² gauge. In the heat exchanger 5, the reaction liquid had been preheated with steam to 100° C. The average retention time of the reaction liquid was 1.34 hours on the feed base. From the column top, about 1.5 kg/hr. of a gas containing ammonia, carbon dioxide and steam was generated, while from the column bottom, about 7.5 kg/hr. of a reaction product liquid was obtained. According to the above process, the yield of the resulting methionine was 96.0 percent. When the heating at the column bottom was replaced by the direct injection of steam, the amount of withdrawn reaction product liquid was changed to about 9 kg/hr., but no change was seen in the yield.

In the above process, the preheating temperature was elevated, to make the column top temperature 180° C. and the heating at the column bottom was ceased, whereby the column bottom temperature became about 160° C. and about 1.7 kg./hr. of a gas was generated from the column top. In this case, the yield of methionine was lowered to 89.5 percent.

A hydrolysis reaction was effected in the same manner as above, except that in place of the bubble cap column, a plate column having 15 perforated plates was used, and the hydrolysis was carried out in a continuous liquid state, whereby the same result as above was obtained.

EXAMPLE 3

A hydrolysis reaction was effected in the same manner as in Example 2, except that in place of the bubble cap column, a means prepared by packing a one-fourth inch Raschig ring 5 m in height in a tube of 8 cm in inner diameter and 5.5 m in length was used, and the depth of liquid was made 5 m, whereby the same result as in Example 2 was obtained.

We claim:

1. A process for producing α-amino acid, which comprises hydrolyzing a 5-substituted hydantoin compound in the presence of an alkali under a pressure of from about 1.8 to about 27 kg/cm² gauge and at a temperature of from about 130° to about 220° C., characterized in that the hydrolysis is effected while withdrawing out of the hydrolysis reaction system gases generated during the hydrolysis reaction, and the hydrolysis is carried out in an aqueous or aqueous alcoholic medium in an amount of at least 1.5 to 5 liters per mole of the 5-substituted hydantoin compound initially employed.

2. A process for producing alamine, valine, leucine, threonine, methionine, aspartic acid, glutamic acid, phenylalanine and triptophane, which comprises hydrolizing a hydantoin compound having the formula

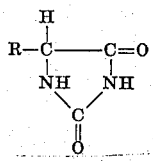

in the presence of an alkali metal hydroxide or carbonate under a pressure of about 1.8 to about 27 kg/cm² gauge at a temperature of about 130° to about 220° C., characterized in that the hydrolysis is effected while withdrawing out of the hydrolysis reaction system gases generated during the hydrolysis reaction, and the hydrolysis is carried out in an aqueous or aqueous alcoholic medium in an amount of from 1.5 to 5 liters per mole of the hydantoin compound initially employed.

3. A process according to claim 2, wherein the hydrolysis is carried out in said medium in an amount of from 1.8 to 5 liters per mole of the hydantoin compound initially employed.

4. A process according to claim 2 in which steam is injected into the hydrolysis reaction system thereby withdrawing out of the system gases generated during the hydrolysis reaction, wherein the amount of said injected steam is adjusted so that the reaction is effected in water in an amount of from 1.5 to 5 liters per mole of the hydantoin compound initially employed.

5. A process according to claim 4 wherein said reaction is effected in water in an amount of from 1.8 to 5 liters per mole of the hydantoin compound initially employed.

6. A process according to claim 2 comprising feeding an aqueous solution of said hydantoin compound to the upper part of a plate column-type reaction zone or packed column-type reaction zone, maintaining the aqueous solution under said pressure and at said temperature to hydrolyze the hydantoin compound, feeding steam to the lower part of the reaction zone and then from the lower parts of the reaction zone to upper parts of the reaction zone in which the hydrolysis substantially takes place thereby stripping from the reaction liquid gases generated during the hydrolysis reaction and withdrawing said gases out of the hydrolysis reaction system, the feed amount of said steam being adjusted so that the amount of water in the zone, in which said hydrolysis takes place, is from 1.5 to 5 liters per mole of the hydantoin compound initially employed, and withdrawing the reaction product liquid after completion of the hydrolysis from the bottom portion of the reaction zone.

7. A process according to claim 2 comprising feeding an aqueous solution of said hydantoin compound to the upper part of a plate column-type reaction zone or packed column-type reaction zone, maintaining the aqueous solution under said pressure and at said temperature to hydrolyze the hydantoin compound, feeding steam from the lower parts of the reaction zone to upper parts of the reaction zone in which the hydrolysis substantially takes place thereby stripping from the reaction liquid gases generated during the hydrolysis reaction and withdrawing said gases out of the hydrolysis reaction system, the feed amount of said steam being adjusted so that the amount of water in the zone, in which said hydrolysis takes place, is from 1.5 to 5 liters per mole of the hydantoin compound initially employed, and heating the reaction product liquid in the lower part of the reaction zone which has completed hydrolysis to generate steam and then withdrawing said reaction product from the bottom of the reaction zone.

8. A process for producing α-aminoisobutyric acid which comprises hydrolyzing a hydantoin compound having the formula

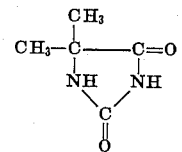

in the presence of an alkali metal hydroxide or carbonate under a pressure of about 1.8 to about 27 kg/cm² gauge at a temperature of about 130° to about 220° C, characterized in that the hydrolysis is effected while withdrawing out of the hydrolysis reaction system gases generated during the hydrolysis, and the hydrolysis is carried out in an aqueous or aqueous alcoholic medium in an amount of from 1.5 to 5 liters per mole of the hydantoin compound employed.

9. A process according to claim 8 wherein the hydrolysis is carried out in said medium in an amount of from 1.8 to 5 liters per mole of the hydantoin compound initially employed.

10. A process according to claim 8 in which steam is injected into the hydrolysis reaction system thereby withdrawing out of the system gases generated during the hydrolysis reaction, wherein the amount of said injected steam is adjusted so that the reaction is effected in water in an amount of from 1.5 to 5 liters per mole of the hydantoin compound initially employed.

11. A process according to claim 10 wherein said reaction is effected in water in an amount of from 1.8 to 5 liters per mole of the hydantoin compound initially employed.

* * * * *